F. R. ELIZONDO.
AUTOMOBILE JACK.
APPLICATION FILED NOV. 23, 1917.
1,297,334. Patented Mar. 18, 1919.
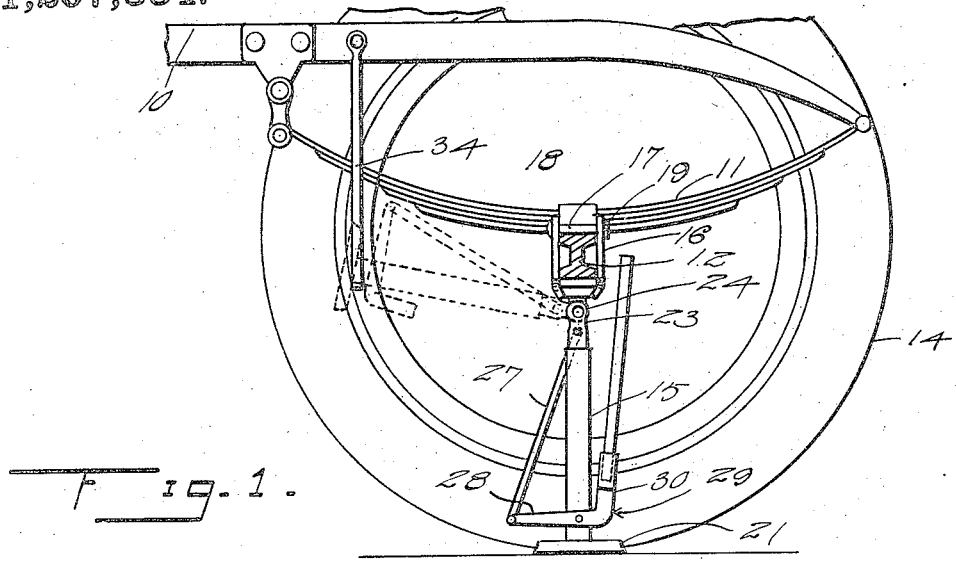
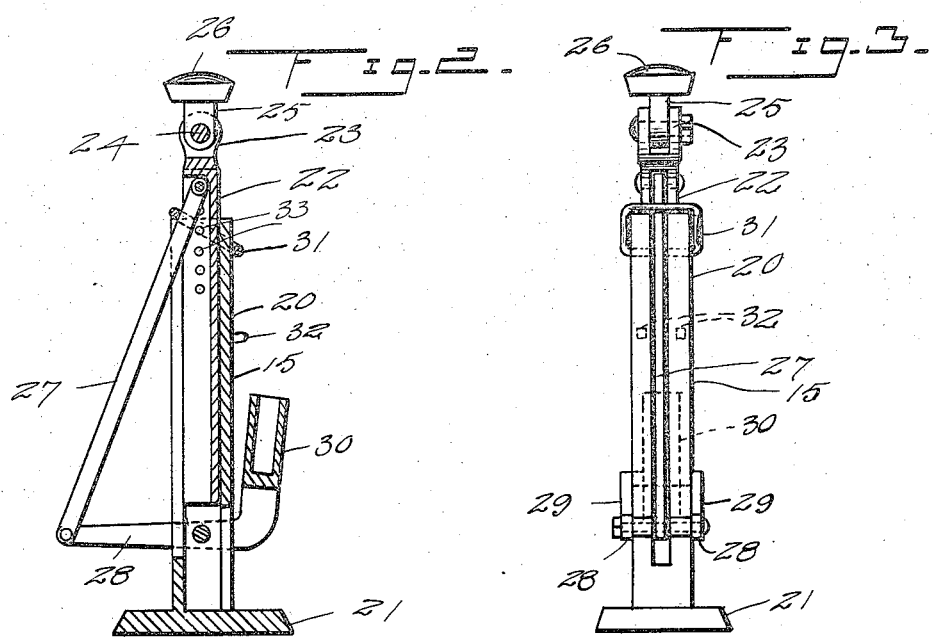
Inventor
Fernando Roque Elizondo
By B. Singer
Attorney
Witness

UNITED STATES PATENT OFFICE.

FERNANDO ROQUE ELIZONDO, OF MEXICO, MEXICO.

AUTOMOBILE-JACK.

1,297,334.   Specification of Letters Patent.   Patented Mar. 18, 1919.

Application filed November 23, 1917.   Serial No. 203,570.

*To all whom it may concern:*

Be it known that I, FERNANDO ROQUE ELIZONDO, a citizen of the Republic of Mexico, and a resident of Mexico, Mexico, have invented certain new and useful Improvements in Automobile-Jacks, of which the following is a full, clear, and exact specification.

The present invention relates to improvements in automobile jacks, particularly that class of jacks which is carried along on the automobile, and which can be released and operated instantaneously to raise one or the other, or any plurality of wheels or other parts of the car in order to allow the making of repairs or exchange of tires etc.

It is the object of the invention to provide jacks which allow a convenient and quick raising of the wheels of a car from the floor in garages at the end of a trip for instance, while the vehicle is not running, in order to eliminate the contact of the tires with the floor.

It is a well established fact that the floors of garages or the like, on account of the cleaning, greasing and oiling of the cars as well as of the drip oil from the engines are more or less greasy or oily and it is the object of the present invention to avoid and prevent contact of the tires with the floor and oil or grease deposited thereon in order to prevent any damage caused by the oil and thus preserve the life of the tires so that the same will retain their durability and outlast those tires which are constantly in contact with the floor.

Another great advantage of the invention is to be seen in the fact that by lifting the tires from the ground when the vehicle is not in use, they will be preserved and outlast any tire which has constantly to sustain the weight of the car.

A still further object of the invention is to provide a device which can easily and conveniently be attached to any of the existing cars of any type or form without alterations, thus providing an inexpensive yet efficient means for jacking up a car whenever necessary or desired.

The jack according to the present invention moreover can be suitably adjusted to suit any elevation of the car, its truck or chassis from the ground.

In the accompanying drawing, which forms part of this specification and is referred to in the following detailed description of the invention:

Figure 1 shows the jack in full lines in operation under a car and in dotted lines in its position of rest.

Fig. 2 is a side view of the jack *per se*, and partly in section.

Fig. 3 is an end view thereof.

Fig. 4 is a detail view of the forked shank.

To the truck 10 of an automobile, the spring 11 is secured in the ordinary well known manner, supported upon the axle 12 carrying the wheel 13 with its tire 14.

The means for securing the jack 15 to the axle of the car consists in general of a hanger 16 adapted to be secured to the axle in any well known and convenient manner for instance as shown by means of the bolt 17 with its head 18 and securing nut 19 upon its threaded end.

The jack 15 comprises a casing 20 having a foot part 21 adapted to firmly engage the ground or floor. Within said casing a bar 22 is arranged and adapted to be displaced in vertical direction. The upper extremity of this bar ending in a link 23 to which the stem 25 of a head or support 26 is pivotally secured as at 24. The head is shaped as shown and will, in consequence of its peculiar shape so engage the car that in combination with its pivotal connection the jack will not break if the car receives a violent shock while being jacked up.

To the link 23 is also pivotally secured a rod or bar 27, the lower free end of which is pivotally secured to the shank 28 of a lifter 29, the operating end of which is formed into a sleeve or cylindrical tube 30 presenting a cup for the reception of an operating bar, not shown.

As shown in Fig. 4, the shank 28 consists of two forks, each pivotally connected to the outside of the casing 20 on opposite sides of the same and one single sleeve or tube 30 is provided for both.

If now a bar is placed with one of its ends into the tube or cup 30 and said cup is depressed by the manipulation of the bar toward the operator, the bar 22 will be lifted and raise the body of the car sufficiently for lifting the wheels from the ground. In this position the jack is locked by means of a ring 31 adapted to slide downward over the bars 22 and 27 until it engages the projection 32 on the outside of the casing.

By means of bolts which are passed through suitable holes 33 in the casing and the bar 22 the jack can be adjusted for use with cars having different levels of trucks from the ground.

If not in use the jack is swung around the pivot of the stem 25 toward the vehicle truck and spring and a suitable hanger or strap 34 is provided to keep the elevated end of the jack above the ground when not in use while the car is running.

Having thus described my invention, what I claim is:

In combination with a vehicle, a lifting jack, comprising a casing, a foot at the lower end of said casing, a vertically reciprocating bar within said casing, a link at the upper end of said bar, a head of peculiar shape pivotally secured with its stem to said link, a rod pivotally secured to said link a double-forked shank pivotally connected with the end of said rod and intermediate its ends with the casing, an operating cup at the outer ends of said shank, means for adjusting the vertically reciprocating bar to any size of cars, and means for locking the jack in its elevated operative position.

In testimony whereof I affix my signature in presence of two witnesses.

FERNANDO ROQUE ELIZONDO.

Witness:
BENNETT S. JONES.